Nov. 28, 1950
R. B. READE
2,531,467
RECEIVER SYSTEM
Filed April 18, 1946
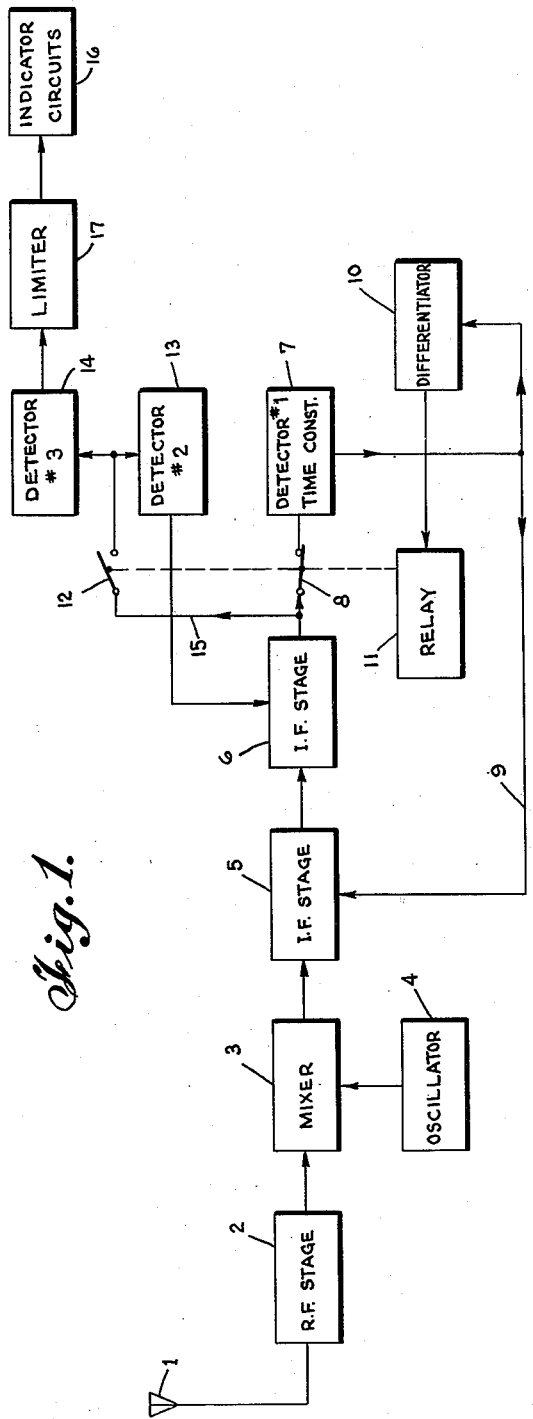
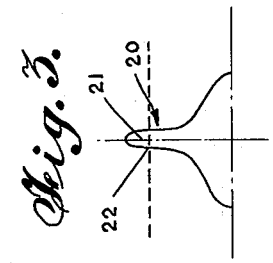
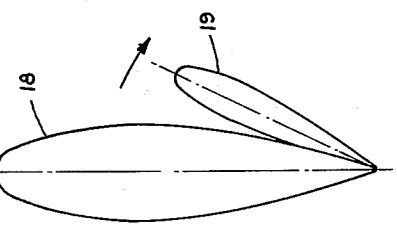
INVENTOR.
RALPH B. READE
BY
*RP Morris*
ATTORNEY Patented Nov. 28, 1950

2,531,467

UNITED STATES PATENT OFFICE 2,531,467

RECEIVER SYSTEM

Ralph B. Reade, Larchmont, N. Y., assignor to Federal Telephone and Radio Corporation, New York, N. Y., a corporation of Delaware Application April 18, 1946, Serial No. 663,128

6 Claims. (Cl. 343—106)

This invention relates to radio beacons and more particularly to receiver circuits for use with radio beacon systems which provide an improved indication of rotary radio beacons of the omnidirectional type.

Systems have been proposed for providing beacon signals which are transmitted from the ground and which will serve to guide an aircraft on a substantially direct line to a fixed location regardless of the direction of approach. These beacons generally provide signal indications which will give the pilot of the craft a given signal when he is in a predetermined direction from the station and different signals from different azimuthal locations about the station. For this purpose, a directive beam which may, for example, be pulse or frequency or amplitude modulated with a predetermined signal, may be transmitted. The receiver in the craft has means for identifying the particular characteristic of the transmission and thereby determining the direction of the craft in respect to the beacon.

One of the difficulties inherent in all such systems is that caused by the width of the beam. Beams frequently vary in width anywhere from two to sixty degrees. As the beam of the beacon station rotates, the leading edge of the beam will first strike an aircraft. At this instant, the transmitted energy will have given signal characteristics indicating a given azimuth. As the beam continues to rotate past the aircraft, these signal characteristics are varied so that by the time the controlling edge of the beam has departed from the aircraft an entirely different set of characteristics producing an indication of an azimuth which may differ by as much as two to sixty degrees from the indication when the first azimuth signal is introduced. It is, therefore, difficult for the pilot to know his true direction in respect to the beacon.

It is an object of the present invention to provide an improved receiver for a rotary radio beacon.

It is another object of the present invention to provide a receiver for a rotary radio beacon of the type described which automatically restricts the indications to the very tip of the beam.

It is still another object to provide a receiver of the type described which permits the use of ordinary peak detection methods in obtaining an instantaneous azimuth reading.

It is still a further object to detect the peak of a rotary beam with the aid of the energy of an advance minor lobe of field pattern transmitted for that purpose.

In accordance with the invention, the transmitter of the beacon system provides a minor lobe pattern of energy in advance of the leading edge of the major lobe pattern constituting the directive beam. As the beam rotates, the minor lobe is first received and serves through a detector to set a predetermined bias level of the receiver by means of normal automatic volume control action. This normal A. V. C. is provided with a long time constant so that the biasing control obtained will remain in effect for a period at least as long as the duration of the time of reception of the beam proper. As the minor lobe passes its peak energy, a differentiator circuit is operated which serves to disconnect the A. V. C. detector from the main circuit so as to prevent the energy of the major lobe from affecting the same during reception. The relay will, at the same time, close a second detector circuit so that when the major lobe is received, a reverse A. V. C. action will be applied to the receiver tending to increase the apparent amplitude and to effectively sharpen the peak or tip of the major lobe energy pattern. This sharpened lobe peak is then detected in the regular direction indicator detector and is applied over a limiter to the translator and indicator circuits.

These and other features and objects of the invention will become more apparent and the invention itself best understood upon consideration of the following detailed description of one embodiment of the invention to be read in connection with the accompanying drawings in which:

Fig. 1 is a diagram in block form of a beacon receiver circuit in accordance with my invention;

Fig. 2 is a graphical illustration of a representative beam pattern; and

Fig. 3 is a graphical representation of an amplified tip of the beam of Fig. 2.

Referring now to Fig. 1, the radio beacon receiver illustrated, which may be mounted in an aircraft, includes a suitable omni-directional antenna 1 feeding into a radio frequency stage 2 and thence into a mixer circuit 3 where the received radio frequency and energy from a beat frequency oscillator 4 are combined to provide an intermediate frequency which is translated in suitable stages 5 and 6. The amplified intermediate frequency energy is then detected in a first detector 7 to which it is fed over a relay controlled circuit or contact 8. After being detected in circuit 7 which includes a time constant device having a long period discharge characteristic, the energy is fed back over a connection 9 into the first intermediate frequency stage 5 as a negative bias to provide by means of an automatic volume control a predetermined rate of gain in respect to said stage. Energy from the detector circuit 7 is also applied to a circuit 10 which is designed in such a way as to provide, in response to a given rate of change of the energy as picked up by the receiver at the tip of the advance lobe, an energizing potential for a relay 11 which operates the contact switch 8 and a second contact 12. This may be accomplished by differentiating the instantaneous amplitude of the received signals by means of any of the differentiating circuits well known in the art, such as a resistor-condenser combination having a long time constant. The switches 8 and 12 are arranged such that when the former opens, the latter is closed. The closure of the switch 12 provides a conductive path for energy from the second intermediate frequency stage 6 to a second and a third detector circuit 13 and 14 respectively over a connection 15. This has the effect of disconnecting the normal A. V. C. detector circuit 7 from its source of energization on stage 6 and to connect the second detector circuit 13 to the stage 6 to supply a reverse A. V. C. action to said stage so as to sharpen the tip of the major beam lobe. The output of the intermediate frequency stage 6 is also applied to the third detector stage 14 as a regular signal and passed to indicator circuits 16 through a clipper limiter circuit 17.

In Fig. 2 is shown a typical energy field pattern of a rotative beam at 18 and an advanced minor lobe associated therewith at 19. The effect of the minor lobe on the receiver circuit described in connection with Fig. 1 is such that as the beam rotates and the peak of the minor lobe is being received, the first detector circuit 7 in combination with the time constant associated therewith applies a predetermined normal A. V. C. bias on the intermediate frequency stage 5 to set a predetermined gain for the stage 5 to provide the stage 6 with a given input regardless of the absolute signal amplitudes. Upon passing of the peak of the minor lobe the differentiating circuit is effective to enable relay 11 by opening its contact 8 to cut out the detector circuit 7. Said normal bias, however, is maintained for a time, as will be explained. Due to the long discharge period which permits the charge to be retained in the time constant circuit for a period which is at least as long as it takes for the major beam to pass, the bias available in the circuit 7 is maintained on the stage 5 throughout the width of the major lobe to maintain the gain of stage 5 at a constant value. Thus, the absolute amplitude of all subsequent radiation patterns is reduced to the same scale with respect to stage 6. This has the effect of producing the same absolute signal amplitude at stage 6 regardless of the absolute value of the major beam lobes received. The operation of the relay 11 also closes the switch 12 which throws into circuit the second and third detector circuits 13 and 14. The energy from the intermediate frequency stage 6, immediately effective after operation of the relay and as soon as the major lobe is being received and which is detected in the second detector circuit serves to provide an inverse automatic volume control to the second intermediate frequency stage whereby positive bias is obtained to effect a gain which increases the larger the amplitude of the received signal becomes. This effect is indicated in Fig. 3 where the topmost portion or tip of the major lobe 18 is shown with an exaggerated amplified peak portion at 20. In view of the use of the gate limiter 17, the output to the indicator will in all instances be confined to a portion 21 above a gate line 22. This condition will prevail for at least as long as the major lobe 18 is being received when the time constant circuit of the detector 7 has become discharged and the lack of voltage in the differentiating circuit 10 causes a release of a relay circuit 11 to again close the switch 8 and to open the contact 12 as shown in Fig. 1.

I have shown that it is thus possible by the use of ordinary peak detection methods to obtain as nearly instantaneous azimuth readings of a rotary beacon beam as is desired in accordance with objects set forth.

While the above is a description of the principles of this invention in connection with specific apparatus, it is to be clearly understood that this description is made only by way of example and not as a limitation on the scope of this invention.

I claim:

1. A receiver for a radio beacon system in whose field pattern a major beam lobe is preceded by an advance minor lobe, comprising a radio receiver for translating radio frequency signals including an intermediate frequency amplifying circuit portion, means for applying an automatic volume control voltage to said intermediate frequency portion including a time constant circuit, means for applying an inverse automatic volume control voltage for exaggerating amplification in said intermediate frequency portion, indicator signal translating circuit means including a peak amplitude clipper, and means for controlling the path for energizing voltage from said intermediate frequency portion to said first and to said second named automatic volume control means respectively.

2. A receiver according to claim 1, wherein said intermediate frequency portion includes a first and second stage and said first named automatic volume control means is connected to control said first stage and said second named automatic volume control is connected to control said second stage.

3. A receiver according to claim 1, wherein said first named automatic volume control means includes a detector and a long period discharge time constant circuit.

4. A receiver according to claim 1, wherein said first and said second named automatic volume control means and said indicator signal circuit means each include a detector circuit.

5. A receiver according to claim 1, wherein said path controlling means includes relay contacts controlled by circuit means responsive to the rate of change in energy received at the passing of the tip of the field pattern of said advance lobe.

6. A receiver for a radio beacon system in whose field pattern a major beam lobe is preceded by an advance minor lobe, comprising a radio receiver for translating radio frequency signals including first and second intermediate frequency amplifying stages, means for providing an automatic volume control voltage to said first intermediate frequency stage including a detector and a time constant circuit having a long period discharge characteristic, means for providing an automatic volume control voltage to said second intermediate frequency stage for exaggerating amplification therein including a second detector circuit, indicator signal translating circuit means including a third detector and a peak amplitude clipper, means normally connecting said first named automatic volume control and disconnecting said second named automatic volume control and said indicator circuit for energization from and with respect to said second intermediate frequency stage, and means responsive to a given rate of change of the energy received at the passing of the peak amplitude of said advance lobe field pattern including a differentiator circuit connected to said detector and a relay for disconnecting said first named automatic volume control and for connecting said second named automatic volume control and said indicator circuit in respect to said second intermediate frequency stage.

RALPH B. READE.

REFERENCES CITED

The following references are of record in the file of this patent:

UNITED STATES PATENTS

| Number | Name | Date |
| --- | --- | --- |
| 1,999,047 | Hahnemann | Apr. 23, 1935 |
| 2,271,522 | Luck | Feb. 3, 1942 |
| 2,307,023 | Cooke et al. | Jan. 5, 1943 |
| 2,393,624 | Ferrill | Jan. 29, 1946 |
| 2,404,501 | Kear | July 23, 1946 |